(12) United States Patent
Cooper

(10) Patent No.: US 7,924,989 B1
(45) Date of Patent: Apr. 12, 2011

(54) INTELLIGENT LINK TELEPHONE COMMUNICATIONS

(75) Inventor: Robert M. Cooper, Arlington, VA (US)

(73) Assignee: AOL Inc., Dulles, VA (US)

( * ) Notice: Subject to any disclaimer, the term of this patent is extended or adjusted under 35 U.S.C. 154(b) by 1218 days.

(21) Appl. No.: 11/548,656

(22) Filed: Oct. 11, 2006

Related U.S. Application Data

(60) Provisional application No. 60/726,234, filed on Oct. 14, 2005, provisional application No. 60/828,929, filed on Oct. 10, 2006.

(51) Int. Cl.
*H04M 11/00* (2006.01)

(52) U.S. Cl. .............. 379/93.09; 379/90.01; 379/265.01

(58) Field of Classification Search .............. 379/90.01, 379/93.09, 265.01, 265.08, 265.1, 265.12, 379/165.13, 266.07, 266.08, 93.12; 705/1, 705/14
See application file for complete search history.

(56) References Cited

U.S. PATENT DOCUMENTS

| | | | | |
|---|---|---|---|---|
| 4,757,267 A | * | 7/1988 | Riskin | 379/114.24 |
| 6,747,970 B1 | | 6/2004 | Lamb et al. | |
| 6,836,476 B1 | | 12/2004 | Dunn et al. | |
| 7,023,980 B2 | * | 4/2006 | Lenard | 379/266.07 |
| 7,260,403 B1 | * | 8/2007 | Zhang | 455/445 |
| 7,664,636 B1 | * | 2/2010 | Hirschberg et al. | 704/231 |
| 2003/0128697 A1 | * | 7/2003 | Narain et al. | 370/352 |
| 2004/0236441 A1 | | 11/2004 | Melideo | |
| 2004/0260413 A1 | | 12/2004 | Melideo | |
| 2005/0141488 A1 | * | 6/2005 | Shtivelman | 370/352 |
| 2005/0246187 A1 | * | 11/2005 | Maltzman | 705/1 |
| 2006/0004627 A1 | | 1/2006 | Baluja | |
| 2006/0149624 A1 | * | 7/2006 | Baluja et al. | 705/14 |

OTHER PUBLICATIONS

Amazon.com Subsidiary Adds Yellow Pages Click-to-Call, http://www.newtelephony.com/newsproducts/54h8155154.html, Retrieved from Internet on Aug. 9, 2005 (2 pages).

* cited by examiner

*Primary Examiner* — Melur Ramakrishnaiah
(74) *Attorney, Agent, or Firm* — Finnegan, Henderson, Farabow, Garrett & Dunner LLP

(57) ABSTRACT

Establishing a telephone call includes enabling display of a visual indicator of a call destination entity and detecting selection by a user of the visual indicator. The availability of the user to receive a first telephone call is determined. Voice communications between the call destination entity and the user are established in response to detection of the selection by the user of the visual indicator and conditioned on the user being determined to be available to receive the first telephone call. Establishing voice communications includes enabling placement of the first telephone call to the user to establish a first PSTN link with the user and enabling a voice communications link to be setup with the call destination entity.

33 Claims, 7 Drawing Sheets

INTELLIGENT LINK TELEPHONE COMMUNICATIONS

CROSS REFERENCE TO RELATED APPLICATION

This application claims priority to U.S. Provisional Patent Application No. 60/726,234, filed on Oct. 14, 2005 and titled INTERNET LINK TELEPHONE ADVERTISING, and to U.S. Provisional Patent Application No. 60/828,929, filed on Oct. 10, 2006 and titled INTERNET LINK TELEPHONE ADVERTISING, both of which are hereby incorporated by reference for all purposes.

TECHNICAL FIELD

This document relates to tools and operations related to a dynamically updateable visual indicator displayed on a web page or other display screen that may be selected by a user to initiate a telephone call with a call destination entity or business corresponding to the visual indicator.

BACKGROUND

Communication technology has changed significantly in recent years with the advent of the Internet. Electronic communication methods between users across the Internet, such as instant messaging and e-mail, have developed that enable users to communicate with each other quickly, efficiently, and at a relatively low cost, irrespective of geographic distance. Moreover, with the rise of the World Wide Web (WWW), users now have the ability to easily access an unprecedented amount of information, to congregate and communicate with each other in online communities, and to purchase products or services online Businesses have been able to increase sales and profits by advertising products and services on the WWW and by using the WWW as another distribution channel to the customer.

DESCRIPTION OF DRAWINGS

FIG. 6 is a VoIP services user interface that includes a visual indicator.

DETAILED DESCRIPTION

Figure 1:
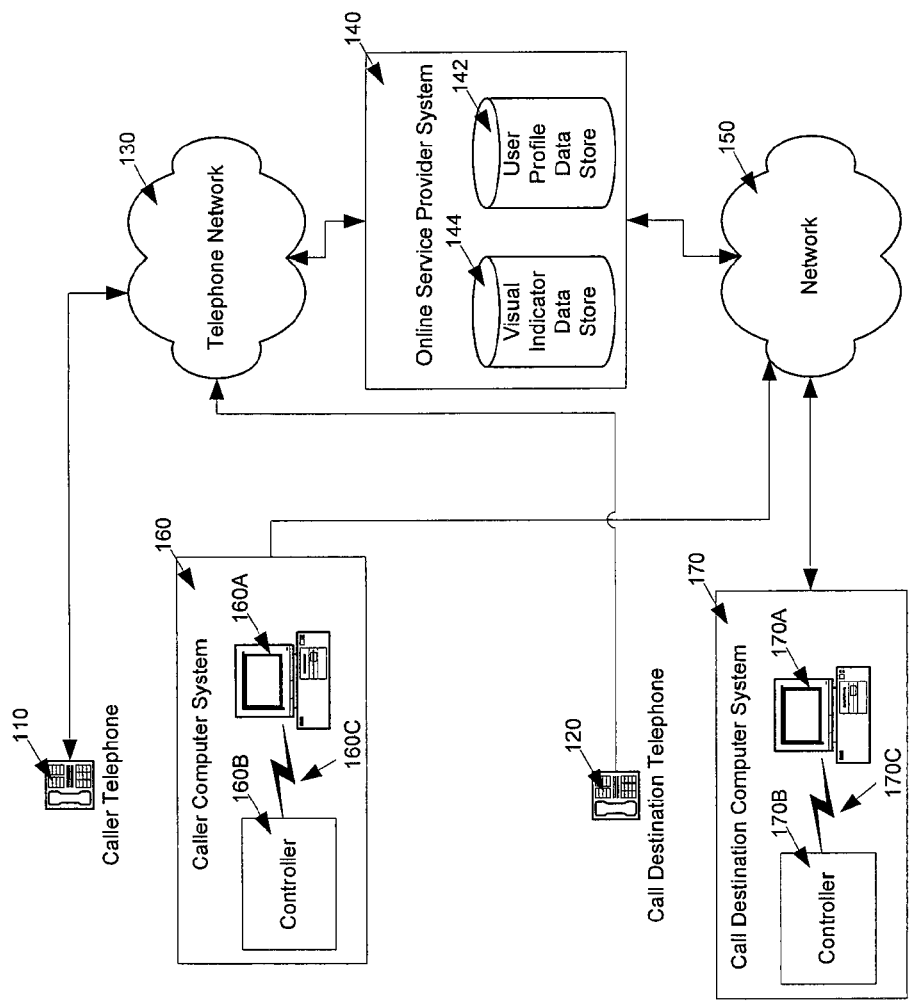
FIG. 1 is a block diagram of a communications system for providing an intelligent link or visual indicator selectable by a user to establish telephone communications between the user and a call destination entity.

In one particular implementation, a communications system includes an online service provider system that enables presentation of a display screen to a user that includes a visual indicator, such as a graphical advertisement (e.g., a banner ad, a text only ad, an image ad, an audio ad, a video ad, or an ad combining one or more of these components), selectable by the user to initiate a telephone call with a business or entity corresponding to the visual indicator (e.g., the business that is using the visual indicator to advertise products or services). The display screen may be, for example, a home web page of the online service provider or an instant messaging user interface that enables access to instant messaging services provided by the online service provider system.

Upon selection of the visual indicator by the user, the online service provider system accesses a direct telephone number of the user from, for example, a user profile. The online service provider system also accesses information usable to setup a voice communications link with a representative of the business (e.g., a customer service or a sales agent of the business). In some implementations, the online service provider system identifies and accesses voice communications information for a representative that is determined to be geographically near to a location of the user (e.g., a customer service or a sales agent at a retail outlet of the business that is located within 5 miles of the location of the user).

The online service provider system establishes a PSTN link with the user by placing a call to the user's telephone number. Upon the user accepting the call (e.g., by answering the user's PSTN telephone), the online service provider system sets up a voice communications link with the representative and bridges the PSTN link with the voice communications link to enable a voice communications session to take place between the representative and the user. In a non-Voice-over-Internet Protocol (non-VoIP) implementation, the voice communications link between the online service provider system and the representative may be a PSTN link and the online service provider system may act as a bridge between the two PSTN links to enable voice communications between the user and the representative. In a VoIP implementation, the voice communications link between the online service provider system and the representative may be a VoIP link over a data network, and the online service provider system may act as a gateway bridging the PSTN link with the user and the VoIP link with the representative to create a path for voice communications. Notably, in both implementations, the user need only have a PSTN telephone to enable a telephone call between the user and the representative to be setup. Thus, the user is not required to have any special equipment to enable voice communications between the user and the representative to be setup in response to selection of the visual indicator (e.g., the user is not required to have any VoIP equipment).

Because the online service provider system is actively involved in the call setup process that takes place upon user selection of the visual indicator, the online service provider system is able to track the call history of the user over time. The online service provider system may analyze the call history of the user to determine patterns of behavior or daily routines of the user. Determining the patterns of behavior or daily routines of the user enables the online service provider system to present to the user particular visual indicators at particular times during the user's daily routine that the user is more predisposed to select (e.g., because the visual indicators advertise products or services that the user is more likely to find useful at that particular time). For example, if the call history indicates that the user calls a restaurant for food delivery every other Tuesday between 5 and 6 pm, the online service provider system may advantageously present a visual indicator to the user every other Tuesday between 5 and 6 pm that advertises a restaurant that delivers food. By maintaining records of the user's call history, the online service provider system also may help businesses setup customer loyalty programs (e.g., if a customer calls the business frequently, the customer may be deemed a regular customer and receive discounts) and may modify the visual indicator presented to the user in accordance with the user's assessed loyalty status (e.g., "As a valued customer, you are eligible for a 10% discount on your next purchase").

In another implementation, the online service provider system provides the user with voice services and maintains a record of not just the calls setup by the online service provider system in response to selection of a visual indicator, but also all calls made by the user using the voice service. For example, the online service provider system may provide VoIP services to the user. In this implementation, the link that is setup between the online service provider system and the user in response to selection of a visual indicator may be a VoIP link, rather than a PSTN link.

In addition to setting up a call with the business upon selection of the visual indicator by the user and tracking the call history of the user, the online service provider system is also able to update the user's calendar and/or add contact information corresponding to the business to the user's contact list or address book in response to user selection of the visual indicator and/or in response to a successful transaction between the user and the business. For example, the online service provider system may update an address book for the user to include the name and telephone number of the business corresponding to the selected visual indicator and/or update a calendar for the user to include various critical dates related to the transaction (e.g., an order reminder, a shipment date, and a payment date). The online service provider system also may update the user's electronic wallet to reflect transactions between the user and the business. In this manner, the online service provider system may help businesses obtain new customers and solidify relationships with existing customers.

Referring to FIG. 1, in one implementation, a communications system 100 for providing an intelligent link or visual indicator selectable by a user to establish telephone communications between the user and a call destination entity or business includes a caller telephone 110, a call destination telephone 120, a telephone network 130, an online service provider system 140, a network 150, a caller computer system 160, and a call destination computer system 170.

The caller telephone 110 and the call destination telephone 120 are each configured to receive calls and place calls across the telephone network 130. The caller telephone 110 and the call destination telephone 120 may be landline telephones that allow voice communications over the telephone network 130. In another implementation, the caller telephone 110 and/or the call destination telephone 120 may be cellular telephones or mobile personal digital assistants (PDAs) with embedded cellular telephone technology. In some implementations, the caller telephone 110 and/or the call destination telephone 120 are PSTN telephones capable of communicating across PSTN links over the telephone network 130. In another implementation, the caller telephone 110 and/or the call destination telephone 120 are Internet Protocol (IP) telephones configured to enable VoIP communications over the telephone network 130. Additionally or alternatively, the caller telephone 110 and/or the call destination telephone 120 may be connected to the caller computer system 160 and/or the call destination computer system 170, respectively, via an analog telephone adaptor (ATA) device to enable VoIP communications over the network 150. In yet another implementation, the caller telephone 110 and/or the call destination telephone 120 may be integrated into the caller computer system 160 and/or the call destination computer system 170, respectively, as softphones configured to enable VoIP communications over the network 150.

The telephone network 130 is configured to enable direct or indirect voice communications between the caller telephone 110, the call destination telephone 120, and the online service provider system 140. The telephone network 130 may be configured to receive call handling instructions from the online service provider system 140. The call handling instructions are instructions that tell the telephone network 130 how to process a call. The call handling instructions may include, for example, instructions to accept a call, refuse a call, and forward a call to another telephone number (e.g., to a telephone number corresponding to a voicemail system or a different telephone).

The telephone network 130 may include a circuit-switched voice network, a packet-switched data network, or any other network able to carry voice. For example, circuit-switched voice networks may include the Public Switched Telephone Network (PSTN), and packet-switched data networks may include networks based on the Internet protocol (IP) or asynchronous transfer mode (ATM), and may support voice using, for example, VoIP, Voice-over-ATM, or other comparable protocols used for voice data communications. In some implementations, the telephone network 130 and the network 150 are integrated into a single network.

The online service provider system 140 is a computer system configured to provide online services to users, including data and/or voice services. The online services may include communications services, such as, for example, one or more of e-mail services, instant messaging services, chat services, VoIP services, and traditional telephony services, and content provisioning services, such as, for example, Internet access (e.g., access to the World Wide Web) and/or access to online content (e.g., access to otherwise restricted or proprietary content). The online service provider system 140 also may provide users with various time management, personal management, and financial management services. For example, the online service provider system 140 may provide users with a calendar service, an electronic wallet, and an electronic address book. The online service provider system 140 may host and store its own electronic content (e.g., a home Web page or Web site) presentable to the user and accessible by the user using a data retrieval application, such as, for example, a browser application.

The online service provider system 140 includes a user profile data store 142 and a visual indicator data store 144. The user profile data store 142 is one or more locally or remotely accessible storage devices configured to store user profile records that include contact information for users and call histories of users. The contact information for a user may include information usable by the online service provider system 140 to place a call to the caller telephone 110, such as, for example, the caller direct number (e.g., 123-456-7890) or the caller telephone IP address (e.g., 1.160.10.240). The user contact information also may include a physical address (i.e., street address, city, state, and zip code), a login name (e.g., scorpio624), an instant messaging handle, an e-mail address, and/or secondary telephone numbers (e.g., a cell phone number).

The call history of a user may include the date, time, duration, and call destination of the various calls placed through the online service provider system 140. If the online service provider system 140 does not provide voice services (e.g., VoIP or traditional telephony services) to the user, the call history may reflect only those calls setup by the online service provider system 140 in response to the user selecting a visual indicator in a display screen, as described in more detail below. If the online service provider system 140 provides voice services to the user, the call history may reflect all calls setup by the online service provider system 140 for the user.

To preserve a user's privacy, the user profile record also may include a flag or opt-in field that indicates whether or not a user has opted to allow the online service provider system 160 to intelligently select and place visual indicators through analysis of the user's call history. If the user selects to opt-out, the online service provider system 140 does not analyze his or her call history when selecting and placing visual indicators. The user profile records also may optionally include user demographic information (e.g., age, income, race, etc.), a listing of services that the user is receiving from the online service provider (e.g., e-mail service, IM service, VoIP service), service preferences, and specific business transaction information with various businesses corresponding to visual indicators supported by the online service provider system 140 (e.g., loyalty status, transaction history, etc.). The service preferences may include, for example, e-mail settings (e.g., white lists, black lists), IM settings (e.g., buddy lists), and VoIP settings (e.g., call block lists and call handling preferences based on caller identity).

The visual indicator data store 144 is one or more locally or remotely accessible storage devices configured to store data corresponding to various visual indicators associated with call destination entities or businesses. A visual indicator may be a graphical advertisement associated with a call destination entity, such as, for example, a banner, a text ad, a video ad, an audio ad, or any combination thereof. The visual indicator also may be an icon or button that includes a visual representation of the call destination entity (e.g., a logo of the business with or without additional text). The visual indicator may be selected by the user to send a signal to the online service provider system 140 to establish a call with the corresponding call destination entity or business. For example, the user may use an input device, such as a mouse or trackball, to place a cursor on the visual indicator and press a button on the input device to "click" or select the visual indicator. The visual indicator may include, for example, an embedded link that automatically sends a signal to the online provider system 140 in response to user selection. In one implementation, the signal is a Hypertext Transfer Protocol (HTTP) communication.

The appearance of a visual indicator may be tailored to a given user to reflect the user's transaction or call history with the call destination entity or business. For example, if the call destination entity is a fast food pizza parlor and the user has purchased four pizzas in the past 3 months, the visual indicator may include the following text: "Sorendor's Pizza—You only need to purchase one more pizza to get a free pizza! Click on me to call right now for free and fast delivery!" In another example, if the caller has called the fast food pizza parlor more than 5 times in the past month and each of the calls had a duration of 2 or more minutes, the visual indicator may include the following text: "Sorendor's Pizza—As one of our valued customers, you will receive $3.00 off your next pizza! Click on me to call right now for free and fast delivery!" Moreover, both the appearance and the time of presentation of the visual indicator also may be tailored to a given user's daily routine, as described in more detail below.

The online service provider system 140 is configured to respond to requests for electronic content submitted by the user of the caller computer system 160 across the network 150. In response to the requests for electronic content, the online service provider system 140 may provide data to the caller computer system 160 to update a display screen to present to the user the requested electronic content in combination with a visual indicator selected by the online service provider. The display screen may be any graphical display that is configured to include a promotional data field updateable to include a visual indicator. For example, the display screen may be an application user interface used by the user to access or interact with one or more of the online services offered by the online service provider system 140 (e.g., an instant messaging user interface, a chat services user interface, an Internet browser user interface, and a VoIP services user interface). The online service provider system 140 also may be configured to update the visual indicator presented to the user at different times periodically throughout the day, irrespective of whether the online service provider system 140 has received a request for electronic content from the user. The online service provider system 140 may select a visual indicator from among multiple available visual indicators for presentation to the user based on the call history of the user, other profile information of the user, the date, and the time of day.

In particular, the online service provider system 140 may select a visual indicator by analyzing the call history of the user to determine behavioral patterns or daily routines of the user. For example, the user may often call a fast food restaurant to request food delivery on Tuesdays between 6-8 pm every other week. Recognizing this behavioral pattern or habit, the online service provider may target advertisements to the user more effectively by displaying to the user every other Tuesday from 6-8 pm visual indicators corresponding to fast food restaurants that deliver (e.g., Sorender's Pizza). Accordingly, the online service provider system 140 may analyze the call history of the user by grouping calls by time period (e.g., one hour time periods for every hour during a week or month), by call destination entity (e.g., Jay's Copying Services and Sorendor's Pizza), and by type of call destination entity (e.g., copying services and fast food restaurants that deliver).

A pattern of behavior over time may be detected by analyzing the regularity of calls over common time periods (e.g., 6-7 pm on Tuesday) over a long duration of time (e.g., over 3 months). The pattern of behavior provides insight as to the likelihood that the user will act upon an advertisement presented to the user for a particular business or call destination entity. To further illustrate, the online service provider system 140 may determine based on the call history of the user that the user calls Boston Market for food pickup every Monday from 5-7 pm and calls Jay's Copying Services on the first Thursday of every month from 1-2 pm. The online service provider system 140 may send data to the caller computer system 160 to enable display of a visual indicator of Boston Market or another competing restaurant from 4:30 pm-7 pm every Monday and may send data to the caller computer system 160 to enable display of a visual indicator of Jay's Copying Services or another competing copying service from 12:30 pm-2 pm on the first Thursday of each month. Because the user is deemed to be contemplating requesting food services or copying services at these times, it is more likely that the user will select visual indicators corresponding to these types of services at these times.

The online service provider system 140 also may tailor the visual indicator to enable the call destination entity or business to implement customer loyalty programs. The online service provider system 140 may setup business rules specific to a particular business (or generic to multiple businesses) that are applied by the online service provider system 140 to select an advertisement or a visual indicator for presentation to a user that is applicable to the user based on the user's track record of calls to the business. The business rules may specify how the contents of the advertisement or visual indicator should change based on the number and duration of calls made by the user to the business over a predetermined interval of time. For example, the business rules may indicate that if the customer has called the business more than 10 times during the past 2 months for calls lasting 2 or more minutes, the advertisement or visual indicator should inform the user that he or she is a valued customer and that he or she is now receiving a complimentary product, service, and/or discount from the business.

In another implementation, the business rules may specify that the user purchase a number and/or a dollar amount of products or services from the business before a visual indicator is selected that specifies that the user may receive a complimentary product, service, and/or discount from the business. The business may communicate the number and/or dollar amount of purchases made by the user to the online service provider system 140 periodically, automatically, and/or in response to a request from the online service provider system 140, and the online service provider system 140 may apply the business rule to determine the appropriate advertisement or visual indicator to present to the user. For example, if the business is Sorendor's Pizza, and the rule is that a customer receives a free large pizza if the customer has previously purchased 5 pizzas, the online service provider system 140 may select an advertisement that includes text stating that the user has earned a free pizza if Sorendor's Pizza informs the online service provider system 140 that the customer has already purchased 5 pizzas. The user may then select or otherwise click on the advertisement to automatically place a call to, for example, the Sorendor's Pizza facility nearest to the user and a representative (and/or the call destination computer system 170) may be informed automatically by the online service provider system 140 that the user is eligible for a free pizza. Additionally or alternatively, the business rules may indicate that the online service provider system 140 should select advertisements or visual indicators that dynamically present to the user the number of purchases or purchase amounts he or she has left before being eligible for a complimentary discount, product, and/or service (e.g., "You only need to purchase two more pizzas to be eligible for a free large pizza!").

In some implementations, the online service provider system 140 may apply the business rules to the user's call history periodically, after each call, or after a set number of calls by the user to determine the loyalty status of the user. The loyalty status of the user is a measure of the track record of the user in using the products or services offered by the business. The loyalty status may be a category (e.g., Gold Status, Silver Status, or Bronze Status) which corresponds to different treatment of the user by the business and/or different complimentary discounts, products or services. The loyalty status may optionally include a status of the user's eligibility to receive one or more complementary discounts, products or services (e.g., purchased 3 pizzas, needs to purchase 2 more to be eligible for a free pizza). The online service provider system 140 may select an appropriate visual indicator for the user based on the loyalty status of the user. The online service provider system 140 also may select an appropriate representative of the business or call destination entity based on the loyalty status of the user.

The online service provider system 140 is configured to receive a signal from the call destination computer system 160 over the network 150 in response to user selection of the visual indicator. The online service provider system 140 may identify a representative of the business or call destination entity corresponding to the visual indicator, access call destination information for the representative, and access a telephone number for the user from the user profile data store 142. The online service provider system 140 may optionally inform the user of the call destination and request that the user confirm that he or she wishes to place the call (e.g., "Do you wish to place a call to Ron's Drug Store in Arlington, Va.?"). Upon the user confirming the call request, the online service provider system 140 may place an outbound call to the caller telephone 110 over a PSTN link through the telephone network 130 and, prior to or upon the user accepting the call (e.g., by picking up the caller telephone 110), the online service provider system 140 may establish a voice communications link with the call destination telephone 120 and may bridge the PSTN link with the voice communications link to enable a voice communications session to take place between the representative and the user. Notably, the user need not have any special call equipment for the call to be setup between the user and the representative. The voice communications link with the representative may be over the PSTN (or, more generally, over a circuit-switched network) or over the Internet (or, more generally, over a packet-switched network). If the voice communications link with the representative is over the PSTN, the online service provider system 140 may place an outbound call to the call destination telephone 120 to establish a PSTN link with the call destination telephone 120 and bridge the two PSTN links to enable voice communications between the user and the representative. Additionally or alternatively, the online service provider system 140 may send signaling to the PSTN to enable a call to be established between the caller telephone 110 and the call destination telephone 120 without requiring the online service provider system 140 to bridge the PSTN links. If the voice communications link with the representative is over the Internet, the online service provider system 140 may establish a link with the call destination telephone 120 using a VoIP protocol (e.g., H.323 or Session Initiation Protocol) and may act as a gateway to bridge the PSTN link and the VoIP link.

If the online service provider system 140 offers VoIP voice services to the user (or, more generally, packet-switched voice services to the user), the link between the online service provider system 140 and the caller telephone 110 is no longer a PSTN link, but rather is a VoIP link. In this implementation, the online service provider system 140 may act as a softswitch to setup a VoIP connection between the caller telephone 110 and the call destination telephone 120.

In another implementation, the online service provider system 140 may not establish a link to the user in response to selection of the visual indicator. Rather, the online service provider system 140 may establish a voice communications link with the call destination entity or business to enable the call destination entity or business to deposit a voice message in the voicemail box of the user. The deposited voice message may be generated by a computer or user in real-time as it is deposited or may be a pre-recorded message. In another implementation, the online service provider does not setup a link with the user or with the call destination entity or business. Instead, the online service provider system 140 itself automatically places a pre-recorded voicemail from the call destination entity or business in the user's voicemail box in response to selection of the visual indicator. In yet another implementation, the online service provider system 140 deposits the voice message as described above only if the user has been determined to be unavailable to receive a telephone call (e.g., either due to user preferences blocking establishment of such calls or due to the user's telephone line being busy).

In some implementations, the online service provider system 140 includes a billing database (not shown) that processes and stores user billing information for services subscribed to by the various users. The online service provider system 140 may have a billing relationship with the user that enables the online service provider system 140 to bill the user either directly or through the user's telephone service provider the costs incurred in setting up a call between the user and the representative of call destination entity or business upon selection of the visual indicator.

The network 150 is configured to enable direct or indirect communications between the online service provider system 140, the caller computer system 160, and the call destination computer system 170. Examples of the network 150 include the Internet, Wide Area Networks (WANs), Local Area Networks (LANs), analog or digital wired and wireless telephone networks (e.g., Public Switched Telephone Network (PSTN), Integrated Services Digital Network (ISDN), and Digital Subscriber Line (xDSL)), radio, television, cable, satellite, and/or any other delivery or tunneling mechanism for carrying data. In some implementations, the network 150 and the telephone network 130 are implemented by a single or otherwise integrated communications network configured to enable voice communications between the caller telephone 110, the call destination telephone 120, and the online service provider system 140, and configured to enable communications between the online service provider system 140, the caller computer system 160, and the call destination computer system 170.

The caller computer system 160 and the call destination computer system 170 each include a device 160A, 170A capable of executing instructions under the command of a controller 160B, 170B. The device 160A, 170A may be a general purpose computer, such as a workstation or a personal computer, a PDA, a special purpose computer, an intelligent mobile phone, a pager, or a set top box. Alternatively, the device 160A, 170A may be a computer system composed of multiple general purpose or special purpose computers in communication with each other either directly or indirectly through a local area network and/or through a wide area network.

The controller 160B, 170B commands and directs communications between the device 160A, 170A and the online service provider system 140. The controller 160B, 170B may include one or more software or hardware applications that enable digital communications to be exchanged with the online service provider system 140. The device 160A, 170A is connected to the controller 165B, 170B by a wired, wireless or virtual (i.e., when the controller is software running on the device) data pathway 160C, 170C capable of delivering data.

In particular, the controller 160B may include one or more communications applications configured to enable the user to exchange communications with the online service provider system 140 and/or other users. For example, the communications applications may include one or more of an e-mail application, an instant messaging application, a chat services application, and a voice services application (e.g., a Von) service application). The controller 160B also may include information retrieval applications for requesting and accessing electronic content across the network 150 including, for example, a browser application (e.g., to access and view Web pages stored on the World Wide Web). The controller 160B also may include various time management, personal management, and financial management applications.

The time management applications may include, for example, a calendar application that enables a user to access and populate a calendar stored locally (e.g., at the caller computer system 160) or remotely across the network 150 (e.g., at the online service provider system 140). The calendar may be populated in response to user input and/or in response to communications from the online service provider system 140 to, for example, reflect critical dates/times associated with a transaction between the user and a business (e.g., call date, call duration, order date and shipment date).

The personal management applications may include, for example, an address book application that enables a user to access and populate an address book stored locally (e.g., at the caller computer system 160) or remotely across the network 150 (e.g., at the online service provider system 140). The address book may be populated in response to user input and/or in response to communications from the online service provider system 140 to, for example, include contact information for representatives of a business or call destination entity (e.g., telephone number, e-mail address, IM address, geographic address, name, title, business name, and type of business).

The financial management applications may include, for example, an electronic wallet application that enables a user to debit and/or credit an online financial account for purchasing goods or services online or otherwise. The electronic wallet may be stored locally (e.g., at the caller computer system 160) or remotely across the network 150 (e.g., at the online service provider system 140 or at a financial services host system). The electronic wallet may be modified to include payment information for goods or services purchased by the user and may be debited or credited in response to user input and/or in response to communications from the online service provider system 140 (e.g., to reflect a purchase by the user of a good or service from a business or call destination entity), the call destination entity computer system 170, and/or another local or remote computer system.

The controller 170B may include one or more of the above-described applications. Additionally or alternatively, the controller 170B may include applications specific to the operations of a business. For example, the controller 170B may include one or more of web hosting applications, customer-interfacing applications, inventory management applications, payroll applications, bill management applications, customer account management applications, and business financial management applications. The controller 170B may be configured to direct the device 170A to communicate business rules and/or business transaction information to the online service provider system 140 over the network 150 periodically or in response to requests received from the online service provider system 140. The business transaction information may include a history of purchases by user (e.g., a list of purchases by user including quantity purchased, product/service identity, invoice amount and date of purchase) and/or any other information that enables the online service provider system 140 to apply the business rules to determine the appropriate visual indicators to present to users.

Figure 2:
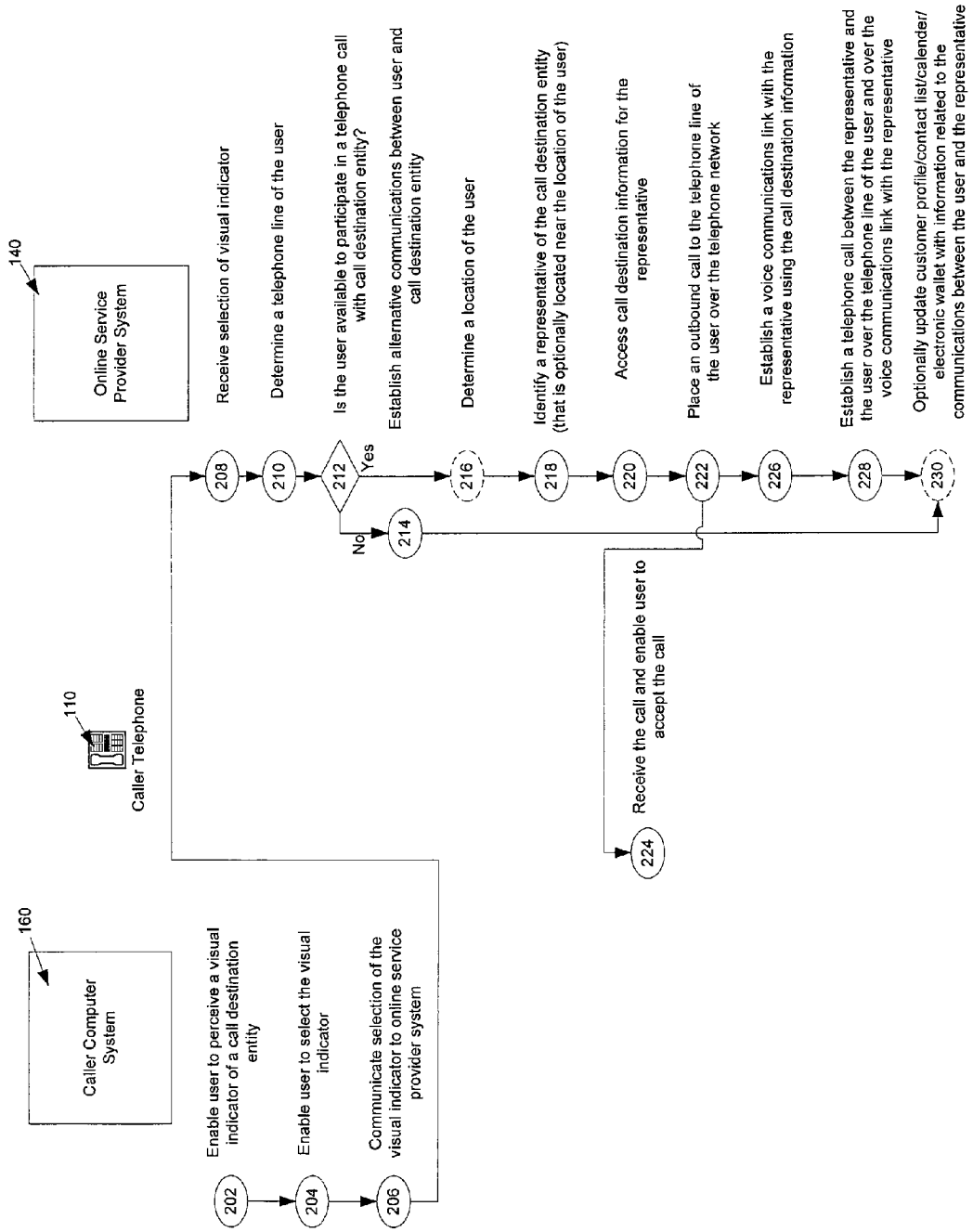
FIG. 2 is a flow chart illustrating a process for establishing a telephone call between a user and a call destination entity in response to selection by the user of a link or visual indicator corresponding to the call destination entity.

FIG. 2 shows a process 200 for establishing a telephone call between a user and a call destination entity or business in response to selection by the user of a visual indicator or link corresponding to the call destination entity or business. For convenience, particular components described with respect to FIG. 1 are referenced as performing the process 200. However, similar methodologies may be applied in other implementations where different components are used to define the structure of the system, or where the functionality is distributed differently among the components shown by FIG. 1.

Figure 3:
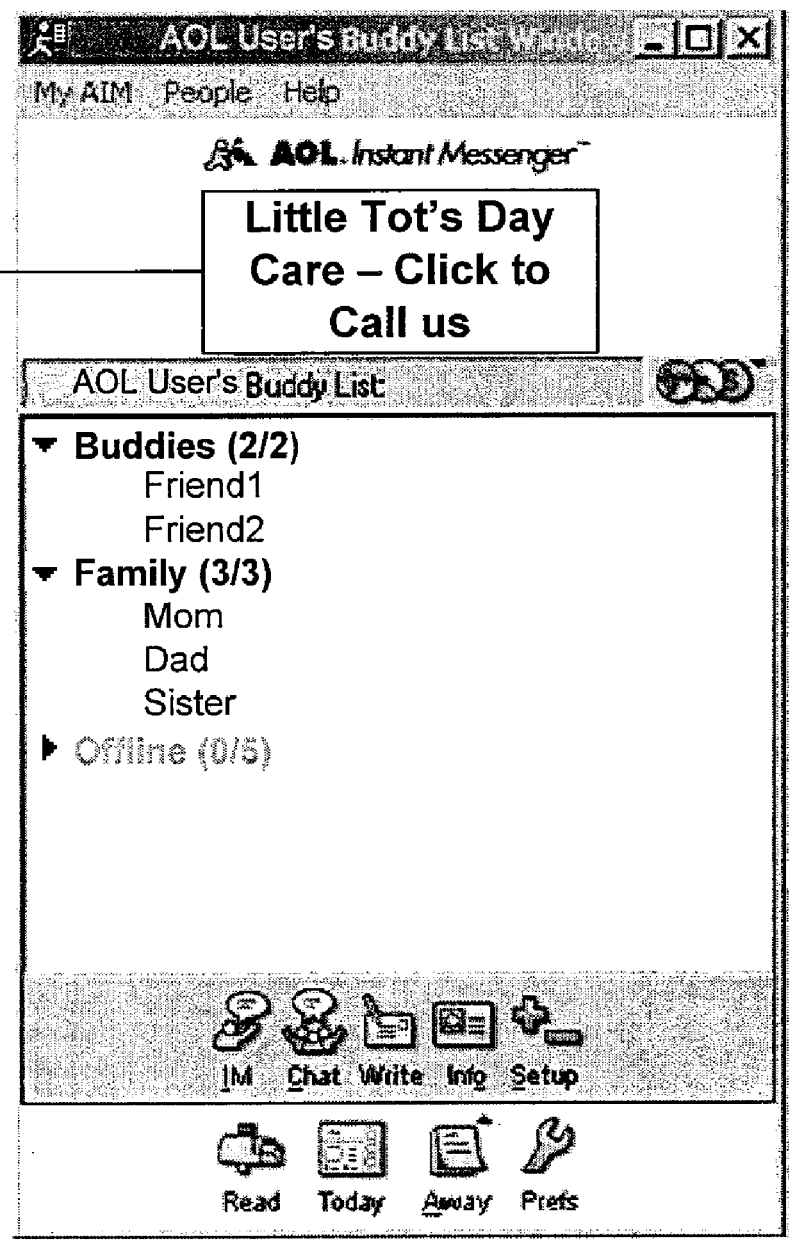
FIG. 3 is an instant messaging user interface that includes a visual indicator.

The caller computer system 160 enables the user to perceive a visual indicator in a display screen (202). FIG. 3 shows an exemplary display screen 300 that includes a visual indicator 305. The display screen 300 is an instant messaging user interface that enables the user to communicate with other users via instant messaging. The visual indicator 305 in this example is a graphical advertisement that includes the text "Little Tot's Day Car—Click to Call Us."

The caller computer system 160 enables the user to select the visual indicator (204). The user may select the visual indicator by, for example, using an input device such as a mouse or trackball to move a cursor over the visual indicator and subsequently pressing a button on the mouse or trackball to "click" or select the visual indicator. For example, the user may use a mouse to click on the visual indicator 305. The caller computer system 160 communicates the selection of the visual indicator to the online service provider system 140 (206).

The online service provider system 140 receives the selection of the visual indicator (208) and identifies a telephone line of the user (210). The online service provider system 140 may identify a telephone line of the user (i.e., a PSTN telephone line) by, for example, accessing a direct number for the user stored in the user profile data store 142. In this implementation, the user is assumed to have logged into a login server of the online service provider system 140 such that the identity of the user is known and a corresponding user record may be accessed. In another implementation, the online service provider system 140 does not identify a telephone line of the user but instead accesses an IP address of the caller telephone 110. In this implementation, the online service provider system 140 is configured to support VoIP services.

The online service provider system 140 determines whether the user is available to participate in a telephone call with the call destination entity or a representative of the call destination entity (212). The online service provider system 140 may, for example, test the telephone line of the user to determine whether or not it is available to receive a telephone call. For example, if the telephone line is busy, the telephone line may not be available to receive a telephone call. In some implementations, the online service provider system 140 may access user preferences to determine whether the user has set a preference to block click-to-call functionality in general, or block click-to-call functionality when selecting visual indicators or advertisements, when selecting visual indicators or advertisements for a particular business or call destination entity (e.g., click-to-call functionality for visual indicators corresponding to the business Casinos-R-Us may be blocked), or when selecting visual indicators or advertisements for businesses or call destination entities corresponding to particular types of businesses or call destination entities (e.g., click-to-call functionality for visual indicators corresponding to adult businesses or 1-900 businesses may be blocked).

If the user is not available to participate in a telephone call with the call destination entity or with a representative of the call destination entity, the online service provider system 140 may establish alternative communications between the user and the call destination entity or representative (214). For example, the online service provider system 140 may setup a text, audio, and/or video instant messaging connection between the user and the call destination entity or representative. Additionally or alternatively, the online service provider system 140 may enable the user to send an e-mail to the call destination entity or representative.

The online service provider system 140 may optionally determine a geographic location of the user (216). The online service provider system 140 may determine a geographic location by, for example, accessing the address of the user directly from the user profile data store 142. Alternatively, the online service provider system 140 may determine a geographic location of the user indirectly based on an IP address of the user (e.g., by communicating with an Internet Services Provider that assigned the IP address and requesting the address).

The online service provider system 140 may identify a representative of the call destination entity (218). The representative of the call destination entity may be identified based on the visual indicator selected by the user. For example, if the selected visual indicator corresponds to the business FedEx®, the representative of the call destination entity may be a sales or customer service agent for the business FedEx®.

Optionally, the online service provider system 140 may select one or more representatives of the call destination entity or business that are located physically near to the geographic location or address of the user. For example, if the selected visual indicator corresponds to Sorendor's Pizza, the online service provider system 140 may select sales or customer service agents at one or more Sorendor's Pizza facilities located near the address of the user. If multiple facilities are deemed physically near to the user (e.g., within 5 miles), the online service provider system 140 may send a signal to the caller computer system 160 instructing the caller computer system 160 to list the multiple facilities to the user and enable the user to select one of the multiple facilities as a destination for the call. The caller computer system 160 responds to the signal by communicating the user's selection to the online service provider 140, which then proceeds to establish a call with the appropriate representative at the selected facility.

In another example, the visual indicator corresponds to a delivery service that offers delivery of products from any of multiple different businesses. For example, the delivery service may be a food delivery service that offers home delivery of food prepared by any of multiple different restaurants. Selection of the visual indicator may result in the user being presented with a list of the multiple different business facilities (e.g., restaurants) having products that may be delivered by the delivery service and that are located physically near to the location of the user. The caller computer system 160 may receive a signal from the online service provider system 140 and, in response to the signal, prompt the user to select a business from among the multiple different businesses local to the user so that the online service provider system 140 may establish a telephone call between the user and a representative of the selected business.

In some implementations, the online service provider system 140 accesses a loyalty status of the user from the user profile data store 142 and identifies a representative based on the loyalty status of the user. For example, if the loyalty status of the user indicates that the user is in a Gold status category, a representative trained to handle higher value clients may be selected. On the other hand, if the loyalty status of the user indicates that the user is a new customer, a representative trained to handle new customer accounts may be selected.

The online service provider system 140 accesses call destination information for the identified representative of the business or call destination entity (220). The call destination information may be accessed from a data store included in the online service provider system 140 (not shown) or locally or remotely accessible by the online service provider system 140 across the network 150. The call destination information may include, for example, a direct number corresponding to a telephone line of the representative (i.e., a PSTN telephone line) connected to the call destination telephone 120. Alternatively, the call destination information may include, for example, an IF address corresponding to the call destination telephone 120 or corresponding to the call destination computer system 170.

The online service provider system 140 places an outbound call to the telephone line of the user over the telephone network 130 (222). In some implementations, prior to placing the outbound call, the caller computer system 160 may inform the user of the call destination (e.g., the physical location of the call destination or the telephone number corresponding to the call destination and optionally whether the call will be a local or long-distance call) and may prompt the user to accept or reject placement of the call. If the user rejects placement of the call, a corresponding signal is sent to the online service provider system 140 and process 200 ends.

The caller telephone 110 receives the call and enables the user to accept the call by, for example, picking up the handset of the caller telephone 110 (224). Upon the user accepting the call, a PSTN link is established between the online service provider system 140 and the caller telephone 110 over the telephone network 130. The user optionally may be audibly informed that a call is being connected with a representative of the call destination entity or business by the online service provider system 140. In another implementation, the online service provider system 140 provides VoIP services to the user and establishes a VoIP link, rather than a PSTN link, with the caller telephone 110 or with the caller computer system 160 across the telephone network 130 or across the network 150.

Prior to, concurrent with, or subsequent to the establishment of the PSTN link with the caller telephone 110, the online service provider system 140 sets up a voice communications link with the call destination telephone 120 over the telephone network 130 using the call destination information for the identified representative (226). As described previously, the voice communications link may be a PSTN link or a link over a packet-switched data network (e.g., a VoIP link).

The online service provider system 140 establishes a telephone call between the user and the representative of the business or call destination entity over the PSTN link with the user and over the voice communications link with the representative (228). As described previously, if the voice communications link is a PSTN link, the online service provider may bridge the two PSTN links or, alternatively, may request that the telephone network 130 enable a direct PSTN link between the caller telephone 110 and the call destination telephone 120. Alternatively, if the voice communications link is a link over a packet-switched data network (e.g., a VoIP link), the online service provider system 140 may act as a bridge between the PSTN link with the user and the link over the packet-switched data network with the representative.

Optionally, the online service provider system 140 may update customer profile, contact list, address book, and/or electronic wallet with information related to the communications between the user and the representative (230). As described previously, the online service provider system 140 may instruct the caller computer system 160 to ask the user prior to, concurrent with, or subsequent to the call whether he or she wishes contact information for the representative to be added to the user's address book. The online service provider system 140 also may instruct the caller computer system 160 to ask the user concurrent with or subsequent to the call whether he or she wishes business transaction information with the call destination entity or business to be reflected in the user's electronic wallet and/or calendar. In another implementation, the caller computer system 160 prompts the user automatically and not in response to signals received from the online service provider system 140. In some implementations, the online service provider system 140 requests business transaction information from the call destination computer system 170 in response to or subsequent to call completion to update the user's calendar and/or electronic wallet to reflect any transactions that occurred or will occur between the call destination entity or business and the user.

The online service provider system 140 also may apply business rules to recalculate the user's loyalty status with the business or call destination entity concurrent with or subsequent to the call. The updated loyalty status may be stored, for example, in a user record in the user profile data store 142.

Figure 4A:
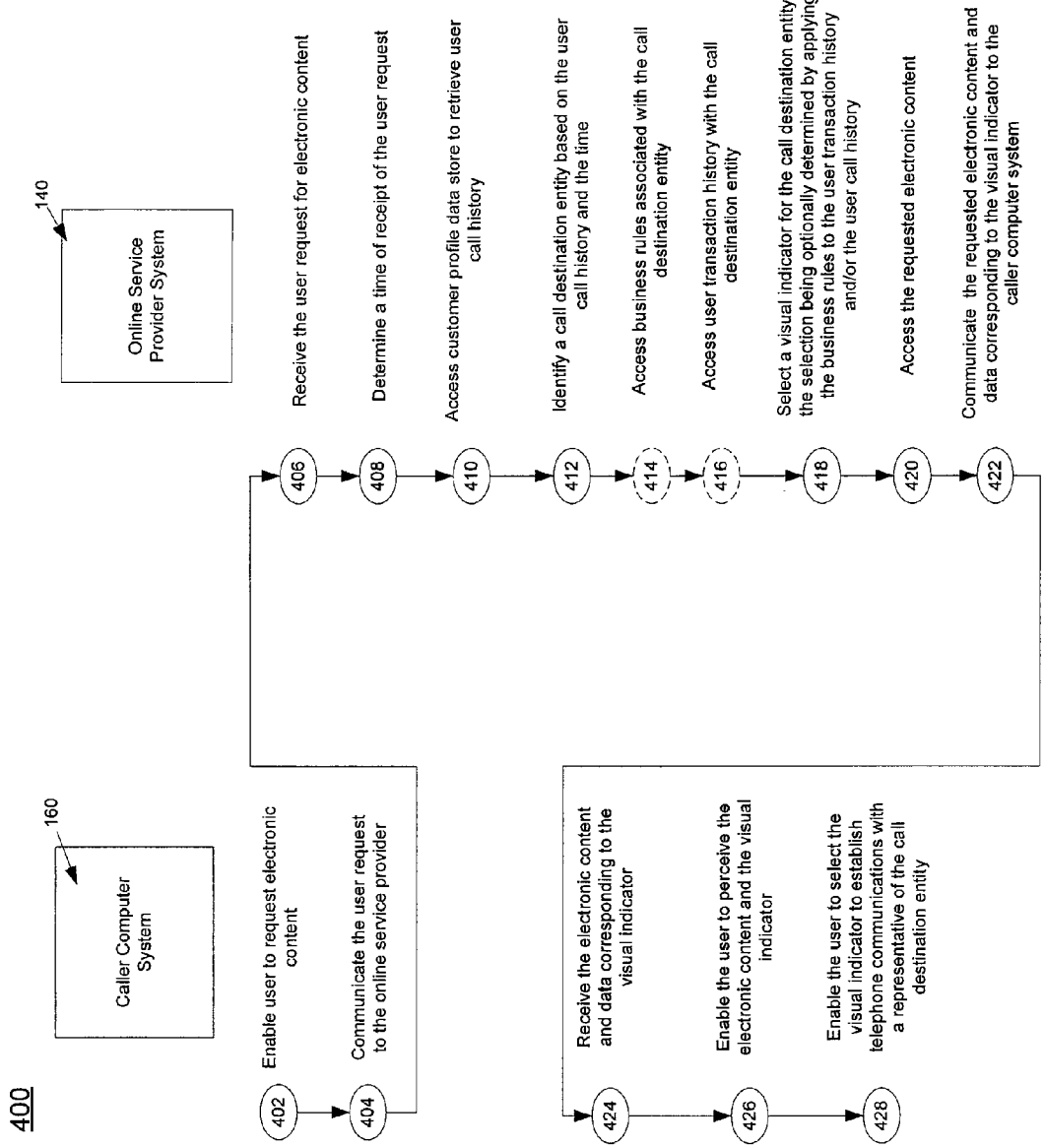
FIGS. 4A-4B are flow charts illustrating a process for selecting and presenting a visual indicator to a user in response to a request for electronic content by the user.

FIG. 4A shows a process 400 for selecting and presenting a visual indicator to a user in response to a request for electronic content by the user. For convenience, particular components described with respect to FIG. 1 are referenced as performing the process 400. However, similar methodologies may be applied in other implementations where different components are used to define the structure of the system, or where the functionality is distributed differently among the components shown by FIG. 1.

The caller computer system 160 enables the user to request electronic content (202) and communicates the user request for electronic content to the online service provider system 140 (204). The user request for electronic content may be any request submitted by the user when using or launching an application or service supported by the online service provider system 140. For example, the user request may include the user powering up the caller computer system 160 such that the caller computer system 160 automatically launches an application or service and requests corresponding electronic content from the online service provider system 140. The user request also may include the user specifically selecting and executing or launching an application by, for example, clicking on or selecting an icon on a graphically displayed desktop, and the caller computer system 160 requesting corresponding content from the online service provider system 140. The user request also may include the user explicitly or implicitly submitting a request to the online service provider system 140 for electronic content while interacting with an application or service (e.g., interacting with a browser application and selecting the home webpage of the online service provider). The user request may be submitted, for example, when the user launches or uses an instant messaging application, an e-mail application, a VoIP services application, an Internet or WWW browser application, a media application, and/or a chat services application.

The online service provider system 140 receives the user request for electronic content (406) and identifies the time and date of receipt of the request (408). In another implementation, the online service provider system 140 identifies only the time of receipt of the request. The online service provider system 140 accesses a customer profile data store 142 to retrieve the user's call history (410). The identity of the user may have been previously determined by the online service provider through a login or user verification process. The user identity may then be used to access the appropriate user profile record in the customer profile data store 142. The online service provider system 140 identifies a call destination entity or business based on the user call history and date/time (412).

Figure 4B:
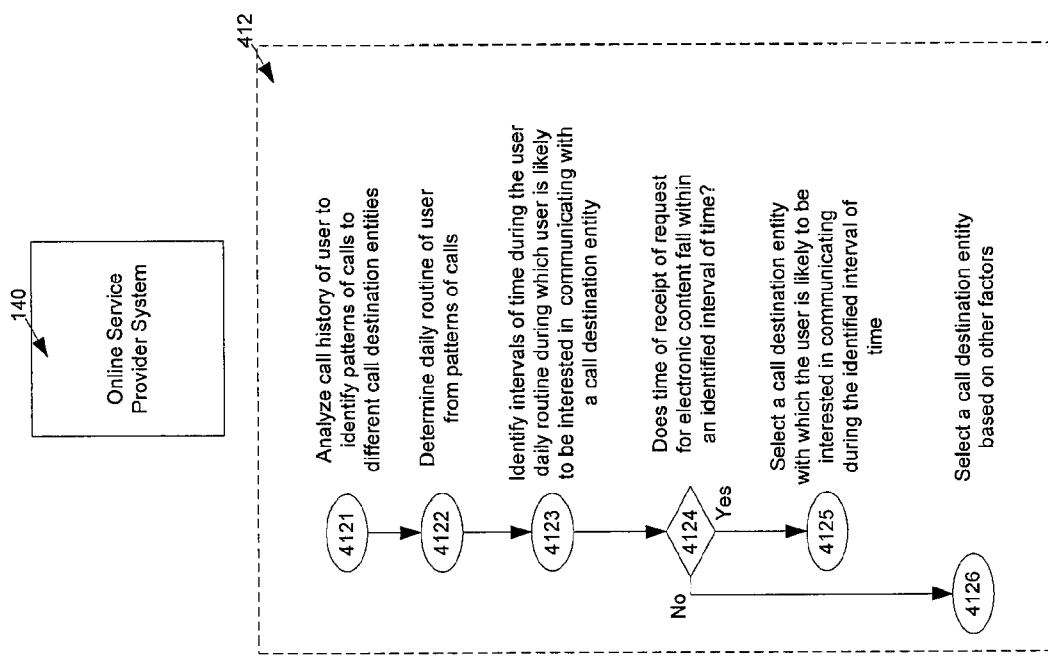

FIG. 4B shows an exemplary implementation of operation 412. The online service provider system 140 analyzes the call history of the user to identify patterns of calls to different call destination entities or to different types of call destination entities (4121). The online service provider system 140 determines a daily routine of the user from the patterns of calls (4122). For example, the daily routine of the user may indicate that the user calls a copying service the first Thursday of every month between 1 and 2 pm, and calls a pizza delivery service every other Monday between 6 and 8 pm.

The online service provider system 140 identifies intervals of time during the user daily routine during which the user will likely be interested in communicating with a call destination entity or business (4123). For example, the online service provider system 140 may identify the interval of time 12:30 pm-2 pm every first Thursday of the month as an interval of time during which the user will likely be interested in communicating with a copying service. The online service provider system 140 also may identify the interval of time 5:30 pm-8 pm as an interval of time every other Monday during which the user will likely be interested in communicating with a pizza delivery service.

The online service provider system 140 determines whether receipt of the electronic request falls within an identified interval of time (4124). Continuing the example, if the electronic request is received at 9 am on a Tuesday morning, the request is not received during an identified interval of time. Conversely, if the request is received on the first Thursday of a month at 12:46 pm, the request is received during an identified interval of time.

If the request is received during an identified interval of time, the call destination entity or business with which the user is likely to be interested in communicating during the identified interval of time is selected (4125). Continuing the example, the call destination entity or business with which the user is likely to be interested at 12:36 pm on the first Thursday of a month is a copying service.

If the request is not received during an identified interval of time, the call destination entity or business is selected based on other factors (4126). For example, the call destination entity or business may be selected based on the demographics of the user or based on the geographic location of the user.

Referring back to FIG. 4A, after the call destination entity is identified, the online service provider system 140 may optionally access business rules associated with the call destination entity (414). The online service provider system also may optionally access the transaction history and/or loyalty status of the user from the user profile data store 142 (416).

For example, if the identified business or call destination entity is Sorendor's Pizza, the online service provider system 140 may access business rules for Sorendor's Pizza that indicate that if the user has purchased 5 pizzas, the user is eligible for a free pizza and if the user is a Gold status member, the user receives a 10% discount on any food order. The user transaction history accessed by the online service provider system 140 may indicate that the user has purchased 4 pizzas in the past and is a Gold status member.

In another example, if the business or call destination entity identified is the Great Wall Chinese Takeout restaurant, the online service provider system 140 may access business rules for the Great Wall Chinese Takeout restaurant that indicate that if the user has called the restaurant more than 10 times in the past 3 months for calls that last 2 or more minutes in duration or if the user has purchased more than $50 worth of food in the last two weeks, the user receives a 15% discount on any food orders. The user transaction history accessed by the online service provider system 140 may indicate that the user has purchased $42.50 of food in the last week.

The online service provider system 140 selects a visual indicator for the identified call destination entity or business (420). In one implementation, the visual indicator is selected to correspond to the identified call destination entity, irrespective of transaction history or business rules. In another implementation, the visual indicator is selected or modified by applying the user's transaction history, loyalty status, and/or call history to the business rules for the identified call destination entity or business.

For example, applying the above-described business rules of Sorendor's Pizza to the above-described transaction history and loyalty status of the user may result in the visual indicator being selected or modified to include the text: "Sorendor's Pizza—Purchase One More Pizza and You Will Receive a Free Pizza! Also, As a Valued Customer, You Will Receive 10% Off the Purchase Price of Any Food Order—Click on this Banner to Order." In another example, if the user call history indicates that the user has called the Great Wall Chinese Takeout restaurant 13 times in the past 3 month for calls that last 2 or more minutes, applying the above-described business rules of the Great Wall Chinese Takeout restaurant to the above-described call history and transaction history may result in the visual indicator being selected or modified to include the text: "Great Wall Chinese Takeout—As a Valued Customer, You Will Receive 15% Off the Purchase Price of Any Food Order."

The online service provider system 140 accesses the requested electronic content (420). For example, if the user launched an instant messaging application, the electronic information may include buddy list information and presence information for users included in the buddy list. In another example, if the user launched a VoIP services application, the electronic information may include call history information and contact list information.

Figure 6:
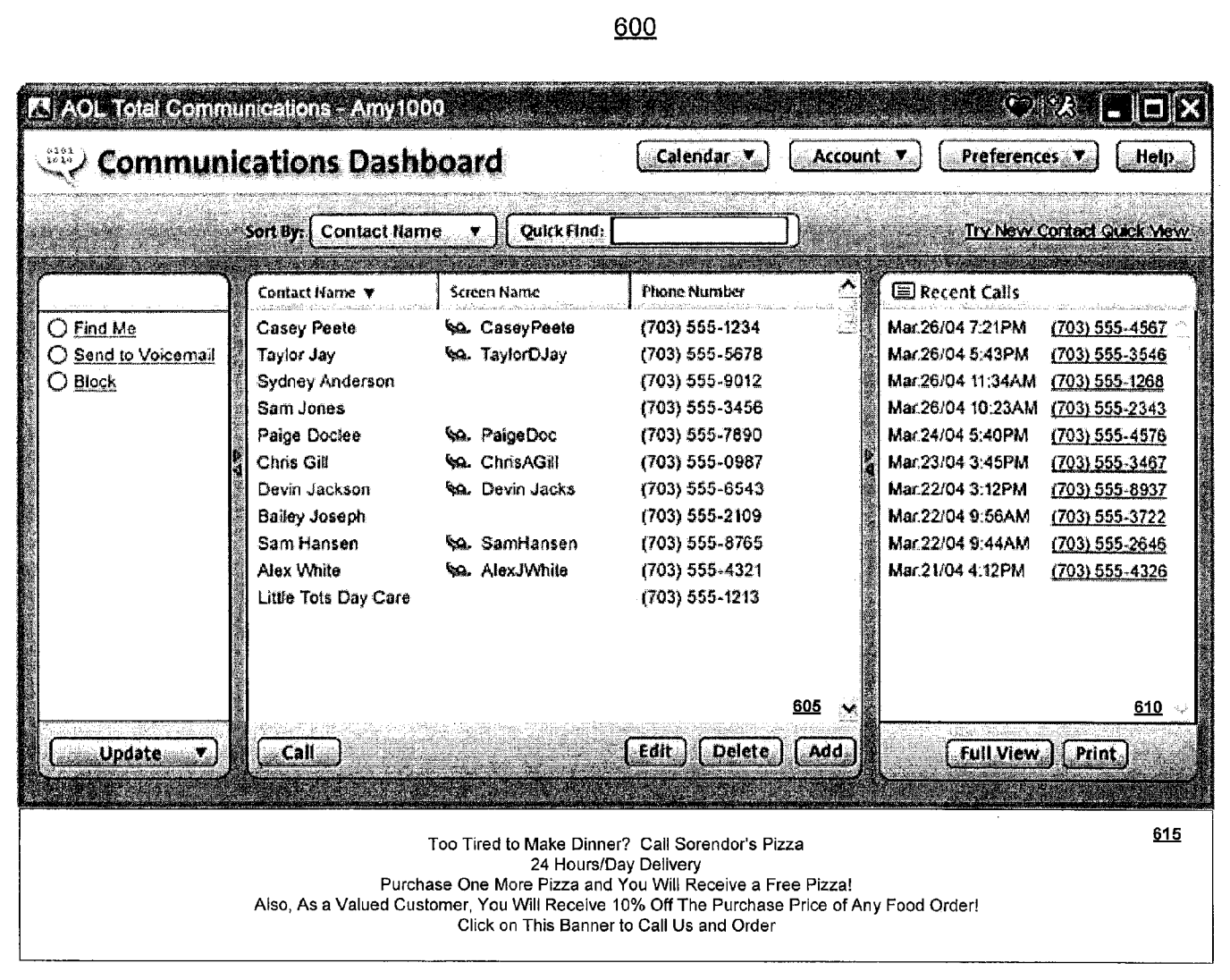

The online service provider system 140 communicates the requested electronic content and data corresponding to the visual indicator to the caller computer system 160 (422). The caller computer system 160 receives the electronic content and data corresponding to the visual indicator (424) and enables the user to perceive the electronic content and the visual indicator in a display screen (426). The instant messaging user interface 300 of FIG. 3 is one example of a display screen that displays a visual indicator 305 along with requested electronic content (e.g., buddy list information and corresponding presence information). FIG. 6 shows a VoIP services user interface or dashboard 600 that is another example of a display screen that displays a visual indicator 615 along with requested electronic content (e.g., the contact list 605 and the call history list 610).

The user may select the visual indicator to establish telephone communications with a representative of the call destination entity (428). Process 200 may be used, for example, to establish telephone communications between the user and a representative of the call destination entity in response to selection of the visual indicator.

Figure 5:
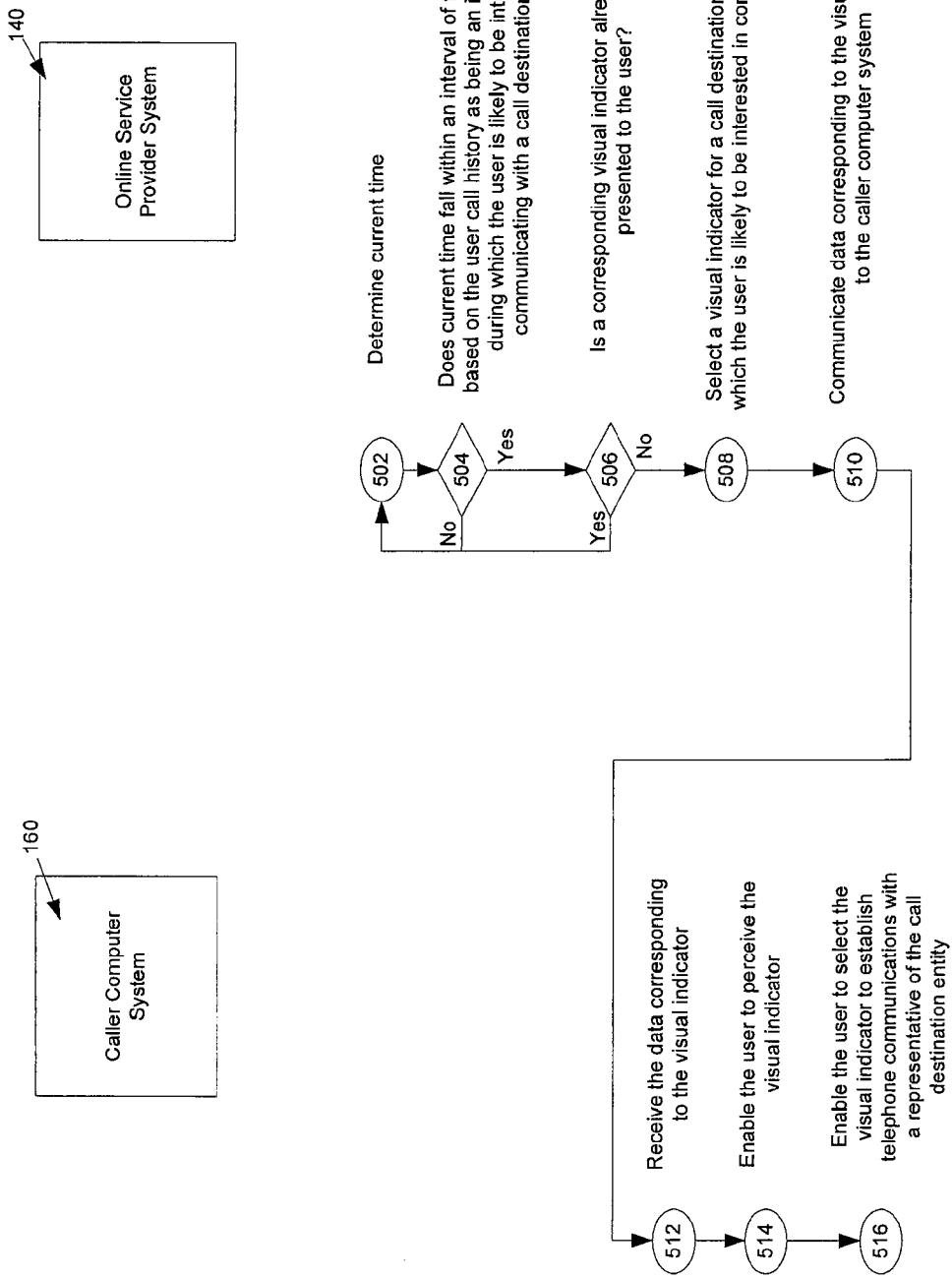
FIG. 5 is a flow chart illustrating a process for selecting and presenting a visual indicator to a user.

FIG. 5 shows a process 500 for selecting and presenting a visual indicator to a user. Unlike process 400, process 500 selects and presents a visual indicator automatically and at a particular time, without regard to submission of electronic requests by the user. For convenience, particular components described with respect to FIG. 1 are referenced as performing the process 500. However, similar methodologies may be applied in other implementations where different components are used to define the structure of the system, or where the functionality is distributed differently among the components shown by FIG. 1.

The online service provider system 140 determines the current date/time (502). The online service provider system 140 determines whether the current date/time falls within an interval of time identified based on the user's call history as being an interval of time during which the user is likely to be interested in communicating with a call destination entity or business (504). If the online service provider system 140 determines that the current time does not fall within an identified interval of time, the online service provider system 140 continues monitoring the time by returning to operation 502.

If the online service provider system 140 determines that the current time does fall within an identified interval of time, the online service provider system 140 determines whether a visual indicator corresponding to the call destination entity or business that the user likely to be interested in is already being presented to the user (506). If the corresponding visual indicator is already being presented to the user, the online service provider system 140 continues monitoring the time by returning to operation 502.

If the corresponding visual indicator is not already being presented to the user, the online service provider system 140 selects a visual indicator for a business or call destination entity with which the user is likely to be interested in communicating during the identified interval of time (508). The online service provider system 140 communicates data corresponding to the selected visual indicator to the caller computer system 160 (510).

The caller computer system 160 receives the data corresponding to the selected visual indicator (512) and enables the user to perceive the selected visual indicator (514). The selected visual indicator may replace a previously displayed visual indicator or may be a modification to a previously displayed visual indicator.

The user may select the selected visual indicator to establish telephone communications with a representative of the call destination entity (516). Process 200 may be used, for example, to establish telephone communications between the user and a representative of the call destination entity in response to selection of the visual indicator.

In another implementation, the online service provider system 140 communicates with the call destination computer system 170 over a back channel connection to inform the call destination computer system 170 that the user of the caller computer system 160 has selected the visual indicator of the call destination entity. The back channel connection may be, for example, a non-anonymous trusted connection (e.g., a virtual private network connection).

The online service provider system 140 may use the back channel connection to provide the call destination computer system 170 with various information usable to contact and/or interact with the user in response to selection of the visual indicator or otherwise. For example, the online service provider system 140 may provide the call destination computer system 170 with information that may be used to call the user (e.g., the user's telephone number) and information that may be used to determine when the call destination entity should call the user (e.g., preferences set by the user that indicate when the user wishes to receive calls or communications, or information that indicates that the call destination entity should call the user at a predetermined time after selection of the visual indicator by the user, the predetermined time being optionally set by the user in response to selection of the visual indicator or otherwise). The online service provider system 140 may additionally or alternatively provide other user profile information (including transaction history information with the call destination entity and/or other user preference information) that may be advantageously leveraged by the call destination entity to improve or inform interactions with the user.

The online service provider system 140 also may additionally or alternatively provide the call destination computer system 170 with information indicating which forms of communication are preferred by the user at specific times (e.g., if during work hours, call at work phone while if during evening hours, call at home phone, or if during work hours, send an instant message rather than call). The online service provider system 140 may additionally or alternatively provide the call destination computer system 170 with presence information of the user, including the current user availability on multiple different communication devices (e.g., cell phone, IM client, e-mail client, PDA, desktop computer, etc.). The call destination computer system 170 may use this information optionally in conjunction with the user's communication preferences to determine how best to contact the user (e.g., at what time and on which communications device) in response to selection of the visual indicator by the user.

Accordingly, other features are within the scope of the following claims.

What is claimed is:

1. A method for establishing a telephone call, the method comprising:
   accessing a call history associated with a user;
   analyzing the call history to determine a pattern of call behavior associated with the user, wherein the pattern of call behavior is determined to be predictive of the user's future call behavior;
   enabling display of a visual indicator, selected based upon the determined pattern of call behavior associated with the user, of a call destination entity;
   detecting selection by the user of the visual indicator;
   determining whether the user is available to receive a first telephone call; and
   in response to detection of the selection by the user of the visual indicator and conditioned on the user being determined to be available to receive the first telephone call, establishing voice communications between the call destination entity and the user,
   wherein establishing voice communications includes:
      enabling placement of the first telephone call to the user to establish a first PSTN link with the user, and
      enabling a voice communications link to be setup with the call destination entity.

2. The method of claim 1, wherein enabling display of the visual indicator includes enabling display of the visual indicator in a graphical display presented to the user as part of one of an instant messaging user interface, an e-mail user interface, and an Internet browser user interface.

3. The method of claim 1, wherein the visual indicator is a graphical advertisement configured to advertise products or services offered by the call destination entity.

4. The method of claim 1, wherein enabling a voice communications link to be setup with the call destination entity includes enabling placement of a second telephone call to the call destination entity to establish a second PSTN link with the call destination entity.

5. The method of claim 4, wherein establishing voice communications between the user and the call destination entity comprises bridging the first PSTN link and the second PSTN link to enable a voice communications path to be setup between the user and the call destination entity over the first PSTN link and the second PSTN link.

6. The method of claim 1, wherein enabling a voice communications link to be setup includes enabling a voice-over-IP communications link to be setup with the call destination entity.

7. The method of claim 6, wherein establishing voice communications between the user and the call destination entity comprises bridging the first PSTN link and the voice-over-IP communications link to enable a voice communications path to be setup between the user and the call destination entity over the first PSTN link and the voice-over-IP communications link.

8. The method of claim 1, further comprising enabling the call destination entity to deposit a voice mail in a voice mailbox of the user conditioned on the user being determined not to be available to receive the first telephone call.

9. The method of claim 8, wherein enabling the call destination entity to deposit a voicemail in the voice mailbox of the user includes setting up a voice communications link between the call destination entity and the voice mailbox of the user.

10. The method of claim 1, wherein determining whether the user is available to receive the first telephone call includes accessing preferences associated with the user and determining whether the user is available to receive the first telephone call based on the preferences.

11. The method of claim 10, wherein determining whether the user is available to receive the first telephone call includes determining that the user is not available if the preferences associated with the user indicate that calls through selection of visual indicators are prohibited.

12. The method of claim 10, wherein determining whether the user is available to receive the first telephone call includes determining that the user is not available if the preferences associated with the user indicate that calls through selection of visual indicators of a category of entities that includes the call destination entity are prohibited.

13. The method of claim 10, wherein determining whether the user is available to receive the first telephone call includes determining that the user is not available if the preferences associated with the user indicate that calls through selection of visual indicators of the call destination entity are prohibited.

14. The method of claim 1, wherein determining whether the user is available to receive the first telephone call includes determining that the user is not available to receive the first telephone call if, in response to an attempt to place a call to the user, signaling information is received that indicates that a telephone line of the user is busy.

15. The method of claim 1, further comprising:
identifying a location of the user; and
identifying a representative of the call destination entity that is geographically close to the identified location of the user,
wherein establishing voice communications between the user and the call destination entity comprises establishing voice communications between the user and the representative that is geographically close to the identified location of the user.

16. The method of claim 1, further comprising establishing alternative communications between the user and the call destination entity when the user is determined not to be available to participate in the telephone call.

17. The method of claim 16, wherein establishing alternative communications comprises establishing an instant messaging session between the user and a representative of the call destination entity.

18. The method of claim 17, wherein establishing an instant messaging session between the user and a representative of the call destination entity comprises establishing an audio-based instant messaging session between the user and the representative.

19. The method of claim 17, wherein establishing alternative communications comprises enabling the user to send an e-mail message to a representative of the call destination entity.

20. The method of claim 1, wherein the call destination entity is a business entity and the first entity is a customer of the business entity, and wherein:
enabling display of the visual indicator includes enabling display of a graphical advertisement of the business entity;
detecting selection by the user of the visual indicator includes detecting selection by the customer of the graphical advertisement;
establishing voice communications between the user and the call destination entity comprises establishing voice communications between the customer and the business entity;
enabling placement of the first telephone call to the user comprises enabling placement of the first telephone call to the customer; and
enabling a voice communications link to be setup with the call destination entity comprises enabling a voice communications link to be setup with the business entity.

21. The method of claim 20, further comprising enabling the customer to complete a business transaction with the business entity.

22. The method of claim 21, further comprising storing information describing the business transaction in association with the customer.

23. The method of claim 20, further comprising:
accessing information describing past transactions between the business entity and the customer; and
determining a loyalty status of the customer based on the accessed information.

24. The method of claim 23, further comprising selecting the graphical advertisement based on the loyalty status of the customer.

25. The method of claim 24, wherein selecting the graphical advertisement based on the loyalty status comprises selecting a graphical advertisement that informs the customer of a complimentary product, service, or discount if the loyalty status of the customer indicates that the customer is a loyal customer.

26. The method of claim 23, further comprising:
identifying a representative of the business entity based on the loyalty status of the user,
wherein establishing voice communications between the customer and the business entity comprises establishing voice communications between the customer and the identified representative.

27. The method of claim 1, further comprising, in response to selection of the visual indicator by the user, adding contact information for the call destination entity to a list of contact information of the user.

28. The method of claim 1, wherein enabling display of the visual indicator includes:
identifying a particular interval of time during which the user is likely to desire to establish a telephone call with the call destination entity, and
providing a visual indicator of the call destination entity for display during the identified particular interval of time.

29. The method of claim 28, wherein providing the visual indicator includes not providing the visual indicator of the call destination entity for display during a time that does not fall within the identified particular interval of time.

30. The method of claim 28, wherein identifying a particular interval of time during which the user is likely to desire to establish a telephone call with the call destination entity comprises:
accessing a call history associated with the user, analyzing the call history to determine patterns of behavior of the user, and identifying the particular interval of time based on the patterns of behavior of the user.

31. The method of claim 28, wherein analyzing the call history to determine patterns of behavior of the user includes analyzing the number, duration, and call destination of calls to identify time periods during which the user regularly calls a particular call destination or type of call destination.

32. A computer system for establishing a telephone call, the computer system including:
- an accessing element configured to access a call history associated with a user;
- an analyzing component configured to analyze the call history to determine a pattern of behavior associated with the user;
- a display element configured to enable display of a visual indicator, selected based upon the determined pattern of behavior associated with the user, of a call destination entity;
- a detection element configured to detect selection by the user of the visual indicator;
- a processing element configured to determine whether the user is available to receive a first telephone call; and
- a voice communications element configured to establish voice communications between the call destination entity and the user in response to detection of the selection by the user of the visual indicator and conditioned on the user being determined to be available to receive the first telephone call, wherein establishing voice communications includes:
- enabling placement of the first telephone call to the user to establish a first PSTN link with the user, and
- enabling a voice communications link to be setup with the call destination entity.

33. An apparatus for establishing a telephone call, the apparatus comprising:
- means for accessing a call history associated with a user;
- means for analyzing the call history to determine a pattern of behavior associated with the user;
- means for enabling display of a visual indicator, selected based upon the determined pattern of behavior associated with the user, of a call destination entity;
- means for detecting selection by the user of the visual indicator;
- means for determining whether the user is available to receive a first telephone call; and
- means for establishing voice communications between the call destination entity and the user in response to detection of the selection by the user of the visual indicator and conditioned on the user being determined to be available to receive the first telephone call, wherein the means for establishing voice communications includes:
  - means for enabling placement of the first telephone call to the user to establish a first PSTN link with the user, and
  - means for enabling a voice communications link to be setup with the call destination entity.

* * * * *